(12) United States Patent
Kowada et al.

(10) Patent No.: US 8,327,630 B2
(45) Date of Patent: Dec. 11, 2012

(54) EXHAUST EMISSION CONTROL DEVICE

(75) Inventors: Minoru Kowada, Hino (JP); Hisaki Torisaka, Hino (JP); Heimo Schreier, Graz (AU); Harald Grantner, Graz (AU); Thomas Obenaus, Graz (AU)

(73) Assignees: Hino Motors, Ltd., Hino-shi (JP); AVL List GmbH, Graz (AT)

( * ) Notice: Subject to any disclaimer, the term of this patent is extended or adjusted under 35 U.S.C. 154(b) by 322 days.

(21) Appl. No.: 12/677,957

(22) PCT Filed: Mar. 17, 2008

(86) PCT No.: PCT/JP2008/000609
§ 371 (c)(1),
(2), (4) Date: Mar. 12, 2010

(87) PCT Pub. No.: WO2009/034664
PCT Pub. Date: Mar. 19, 2009

(65) Prior Publication Data
US 2011/0214416 A1 Sep. 8, 2011

(30) Foreign Application Priority Data

Sep. 13, 2007 (JP) ................................ 2007-237907

(51) Int. Cl.
*F01N 3/24* (2006.01)
(52) U.S. Cl. .......................................... 60/296; 60/317
(58) Field of Classification Search .................. 60/295, 60/296, 301, 303, 317
See application file for complete search history.

(56) References Cited

U.S. PATENT DOCUMENTS

| | | |
|---|---|---|
| 2008/0138256 A1 | 6/2008 | Salasc et al. |
| 2009/0313979 A1 | 12/2009 | Kowada |
| 2010/0000203 A1 | 1/2010 | Kowada |

FOREIGN PATENT DOCUMENTS

DE 2 311 475 10/1973
(Continued)

OTHER PUBLICATIONS

Supplementary European Search Report issued on Mar. 1, 2011 in corresponding European Application No. 08 72 0494.

(Continued)

*Primary Examiner* — Thomas Denion
*Assistant Examiner* — Jonathan Matthias
(74) *Attorney, Agent, or Firm* — Oblon, Spivak, McClelland, Maier & Neustadt, L.L.P.

(57) ABSTRACT

An exhaust system including an exhaust emission control device with a post treatment unit (e.g., a selective reduction catalyst) for depuration of exhaust gas flowing therethrough is disclosed. The exhaust system includes a layout that introduces the exhaust gas into the post-treatment unit through a turnabout. An introductory part encircles an inlet end of the post-treatment unit and receives the exhaust gas through an exhaust inlet port from a direction substantially perpendicular to an axis of the selective reduction catalyst. The introduction part is formed with a first depression cambered away from the inlet end of the selective reduction catalyst and approaching toward the inlet end of the selective reduction catalyst as the first depression extends away from the exhaust inlet port and toward an introduction direction of the exhaust gas, thereby promoting uniformity of the exhaust gas flow entering the post-treatment unit.

5 Claims, 3 Drawing Sheets

FOREIGN PATENT DOCUMENTS

| | | |
|---|---|---|
| DE | 23 45 383 A1 | 3/1975 |
| DE | 196 33 563 A1 | 2/1998 |
| DE | 20 2007 010 435 U1 | 11/2007 |
| FR | 2 772 071 A1 | 6/1999 |
| FR | 2 874 649 A1 | 3/2006 |
| JP | 8 21231 | 1/1996 |
| JP | 2001 526349 | 12/2001 |
| JP | 2005 155404 | 6/2005 |
| JP | 2006 17018 | 1/2006 |

OTHER PUBLICATIONS

U.S. Appl. No. 12/524,727, filed Jul. 28, 2009, Kowada.
U.S. Appl. No. 12/529,024, filed Aug. 28, 2009, Endo, et al.
U.S. Appl. No. 12/676,056, filed Mar. 2, 2010, Kowada.
U.S. Appl. No. 12/678,941, filed Mar. 18, 2010, Endo, et al.
U.S. Appl. No. 12/674,106, filed Feb. 18, 2010, Kimura.
U.S. Appl. No. 12/738,994, filed Apr. 21, 2010, Kowada.
U.S. Appl. No. 12/679,677, filed Mar. 24, 2010, Kowada.
U.S. Appl. No. 12/742,321, filed May 11, 2010, Kowada, et al.

EXHAUST EMISSION CONTROL DEVICE

TECHNICAL FIELD

The present invention relates to an exhaust emission control device.

BACKGROUND ART

It has been recently proposed that a particulate filter for capturing of particulates in exhaust gas is incorporated in an exhaust pipe and a selective reduction catalyst capable of selectively reacting $NO_x$ with ammonia even in the presence of oxygen is arranged downstream of the particulate filter, urea water as reducing agent being added between the reduction catalyst and the particulate filter, thereby attaining reduction of both the particulates and $NO_x$.

Such addition of the urea water to the selective reduction catalyst is conducted between the particulate filter and the selective reduction catalyst. Thus, in order to ensure sufficient reaction time for pyrolysis of the urea water added to the exhaust gas into ammonia and carbon dioxide gas, it is necessary to prolong a distance between a urea water added position and the selective reduction catalyst. However, such arrangement of the particulate filter and the selective reduction catalyst substantially spaced apart from each other will extremely impair the mountability on a vehicle.

In order to overcome this, a compact, exhaust emission control device as shown in FIGS. 1 and 2 has been proposed by one of the applicants as Japanese patent application No. 2007-29923. In the exhaust emission control device of the prior application shown, incorporated in an exhaust pipe 4 through which exhaust gas 3 flows from a diesel engine 1 via an exhaust manifold 2 is a particulate filter 5 housed in a casing 7 to capture particulates in the exhaust gas 3; arranged downstream of and in parallel with the particulate filter 5 and housed in a casing 8 is a selective reduction catalyst 6 having a property capable of selectively reacting $NO_x$ with ammonia even in the presence of oxygen. An outlet end of the particulate filter 5 is connected to an inlet end of the selective reduction catalyst 6 through an S-shaped communication passage 9 such that the exhaust gas 3 discharged through the outlet end of the particulate filter 5 is antithetically turned about into the inlet end of the adjacent selective reduction catalyst 6.

As shown in FIG. 2 which shows substantial parts in enlarged scale, the communication passage 9 is the S-shaped structure comprising a gas gathering chamber 9A which encircles the outlet end of the particulate filter 5 to gather the exhaust gas 3 through substantially perpendicular turnabout of the gas just discharged from the outlet end of the particulate filter 5, a mixing pipe 9B which extracts the gathered exhaust gas 3 from the chamber 9A in a direction antithetical to that of the exhaust gas flow in the filter 5 and which is provided with urea water addition means 10 at an axis of an inlet end of the mixing pipe and a gas dispersing chamber 9C which encircles the inlet end of the selective reduction catalyst 6 so as to disperse the gas 3 guided by the mixing pipe 9B through substantially perpendicular turnabout into the inlet end of the selective reduction catalyst 6.

Arranged in the casing 7 and in front of the particulate filter 5 is an oxidation catalyst 11 for oxidization treatment of unburned fuel in the exhaust gas 3, and arranged in the casing 8 and behind the selective reduction catalyst 6 is an ammonia reducing catalyst 12 for oxidization treatment of surplus ammonia.

With the exhaust emission control device thus constructed, particulates in the exhaust gas 3 are captured by the particulate filter 5. Intermediately of the mixing pipe 9B downstream of the filter, the urea water is added into the exhaust gas 3 by the urea water addition means 10 and is decomposed into ammonia and carbon dioxide gas; on the selective reduction catalyst 6, $NO_x$ in the exhaust gas 3 is favorably reduced and depurated by the ammonia. As a result, both the particulates and $NO_x$ in the exhaust gas 3 are reduced.

In this situation, the exhaust gas 3 from the outlet end of the particulate filter 5 is introduced into the inlet end of the adjacent selective reduction catalyst 6 through antithetical turnabout by the communication passage 9, which ensures a long distance between the urea water added position intermediately of the communication passage 9 and the selective reduction catalyst 6 and facilitates mixing of the urea water with the exhaust gas 3 due to the antithetical turnabout of and thus turbulence of the exhaust gas flow, resulting in ensuring sufficient reaction time for production of ammonia from the urea water.

Moreover, the particulate filter 5 is arranged in parallel with the selective reduction catalyst 6 and the communication passage 9 is arranged along and between the filter 5 and the catalyst 6, so that the whole structure is compact in size to substantially improve the mountability on a vehicle.

As a prior art literature pertinent to the invention, there is, for example, the following Patent Literature 1.
[Patent Literature 1] JP 2005-155404A

SUMMARY OF INVENTION

Technical Problems

Even though the applied structure as shown in FIGS. 1 and 2 may ensure sufficient reaction time of urea water into ammonia, it is feared that the layout applied for introduction of the exhaust gas into the selective reduction catalyst through turnabout may cause the exhaust gas flow to be biased outwardly of a turning direction upon the turnabout; as a result, the exhaust gas may be nonuniformly introduced into the selective reduction catalyst, resulting in failure of sufficient bringing-out of the catalytic ability to be inherently exerted.

It would be possible to suppress the above-mentioned biased exhaust gas flow by turning about the exhaust gas at a position sufficiently away from the inlet end of the selective reduction catalyst to introduce the exhaust gas axially of the selective reduction catalyst. However, it would preposterously resulting in deterioration in mountability.

It may be also conceivable that a dispersion plate is arranged on an inlet side of the selective reduction catalyst for facilitation of uniformalized flow. However, in the situation of the selective reduction catalyst with the urea water being used as reducing agent as illustrated, shielding of the flow by any resistive body such as a dispersion plate after addition of the urea water may bring about corrosion of misty, not completely ammonized urea water on the resistive body to induce deposition of urea. Therefore, intervention by the dispersion plate is to be avoided as much as possible.

The invention was made in view of the above and has its object to attain introduction of exhaust gas through turnabout into a post-treatment unit such as a selective reduction catalyst with uniformized flow distribution of the exhaust gas.

Solution to Problems

The invention is directed to an exhaust emission control device wherein a post-treatment unit for depuration of exhaust gas passing therethrough is arranged in an exhaust system, a layout being applied which introduces the exhaust gas into the post-treatment unit through turnabout, characterized by comprising an introductory part which encircles an inlet end of the post-treatment unit and which introduces the exhaust gas through an exhaust inlet port from a direction substantially perpendicular to an axis of said post-treatment unit, said introductory part being formed with a first depression which is cambered away from the inlet end of the post-treatment unit and which approaches the inlet end of the post-treatment unit as the first depression extends away from the exhaust inlet port into an introduction direction of the exhaust gas.

Thus, when the exhaust gas introduced through the exhaust inlet port from the direction substantially perpendicular to the axis of the post-treatment unit into the introductory part flows axially of the post-treatment unit through turnabout, the flow of the exhaust gas directed outwardly of a turning direction thereof is suppressed by the first depression and that of the exhaust gas directed inwardly of the turning direction is induced so that the tendency of relatively much exhaust gas flow biased outwardly of the turning direction is rectified to uniformize distribution of the exhaust gas flow into the post-treatment unit.

Moreover, it is preferable in the invention that the exhaust passage connected to the exhaust inlet port of the introductory part extends to be directed toward an outlet side of the post-treatment unit, and a second depression is formed just in front of a curved portion constituted by the exhaust passage and the exhaust inlet port so as to guide the flow of the exhaust gas inwardly of the turning direction toward outward.

Thus, for example, for a case where center-to-center distance between the post-treatment unit and the exhaust passage upstream of the exhaust inlet port is fixed and unchangeable due to layout restrictions, the second depression causes a portion of the exhaust passage inwardly of the turning direction once directed outward at a position just in front of the curved portion so that a curvature of the curved portion can be reduced for alleviation of pace of curving, resulting in guidance of the exhaust gas flow into the exhaust inlet port in a smooth manner as much as possible.

Advantageous Effects of Invention

An exhaust emission control device of the invention can attain various effects and advantages as mentioned below.
(I) The exhaust gas can be introduced through the turnabout into the post-treatment unit such as a selective reduction catalyst with uniformized distribution of the exhaust gas, so that the whole volume of the post-treatment unit can be effectively utilized for sufficient bringing-out of the exhaust depuration ability to be inherently exerted.
(II) When the exhaust passage connected to the exhaust inlet port of the introductory part extends to be directed toward the outlet side of the post-treatment unit and the second depression is formed just in front of the curved portion constituted by the exhaust passage and exhaust inlet port so as to guide the flow of the exhaust gas inwardly of the turning direction toward outside, the curvature of the curved portion constituted by the exhaust passage and exhaust inlet port can be reduced for alleviation of pace of curving, resulting in guidance of the exhaust gas flow into the exhaust inlet port in a smooth manner as much as possible. As a result, the tendency of relatively much exhaust gas biased outwardly of the turning direction can be further rectified and substantial increase in pressure loss due to the turnabout of the exhaust gas can be also prevented.

REFERENCE SIGNS LIST 3 exhaust gas
4 exhaust pipe
6 selective reduction catalyst (post-treatment unit)
13 exhaust inlet port
14 introductory part
15 depression (first depression)
16 mixing pipe (exhaust passage)
17 depression (second depression)

DESCRIPTION OF EMBODIMENT

An embodiment of the invention will be described in conjunction with the drawings.

Figure 1:
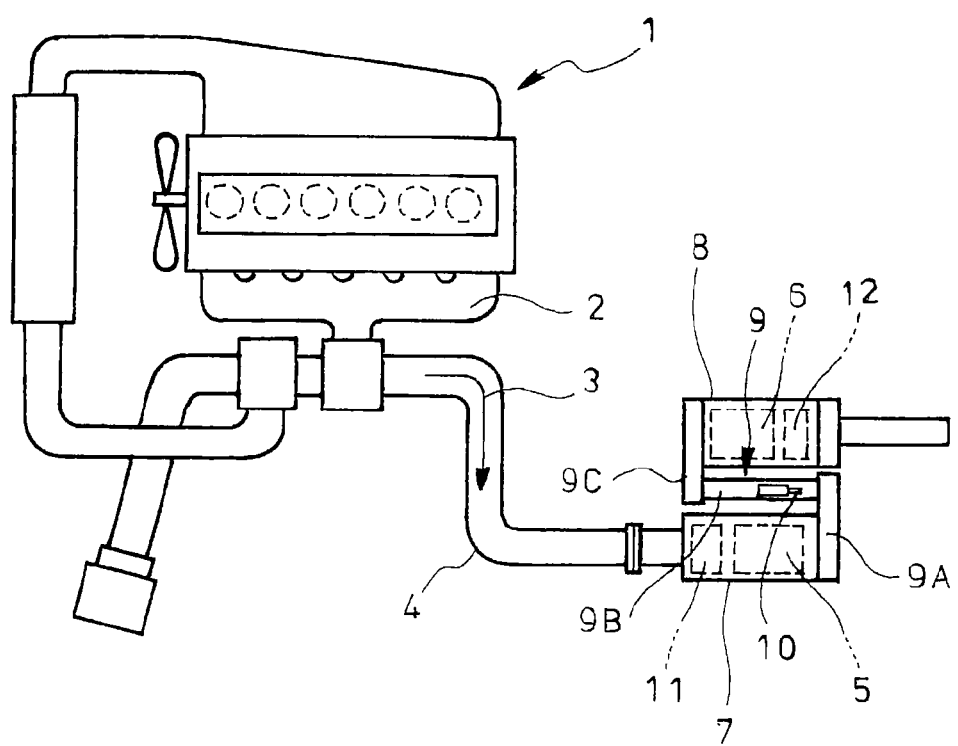
FIG. 1 is a schematic view showing a conventional device.
Figure 2:
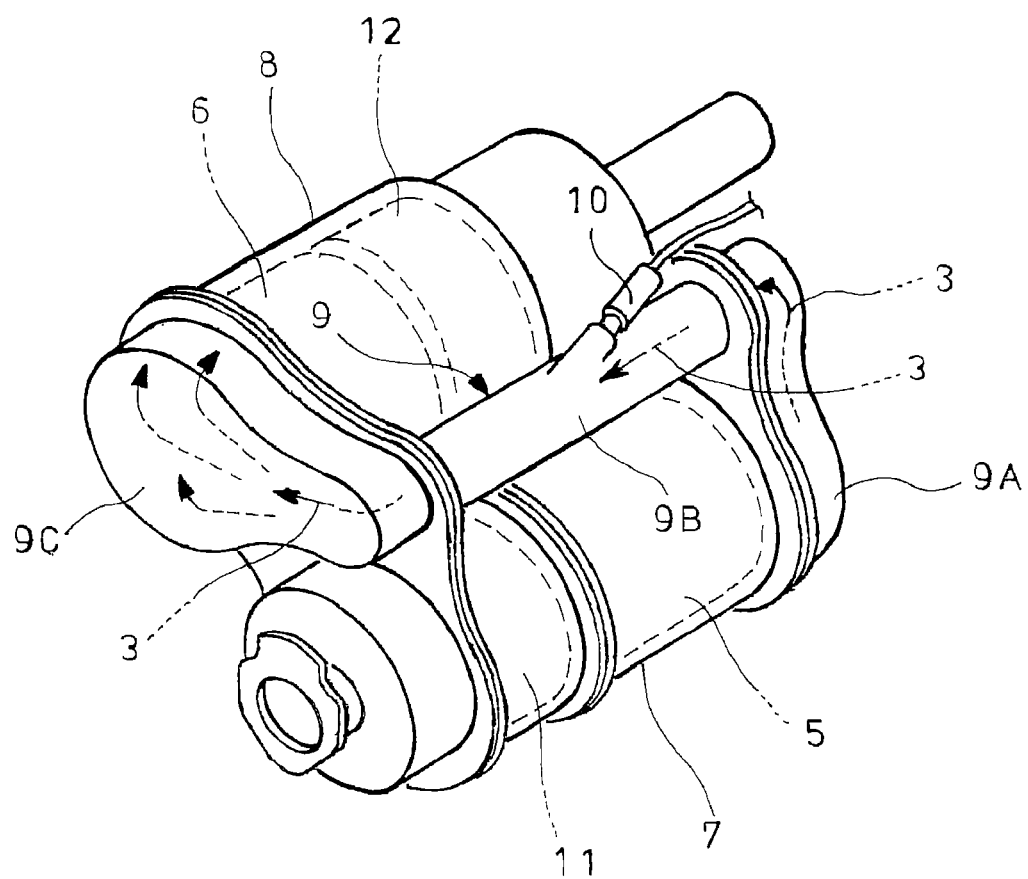
FIG. 2 is a perspective view showing substantial parts of FIG. 1 in enlarged scale.
Figure 3:
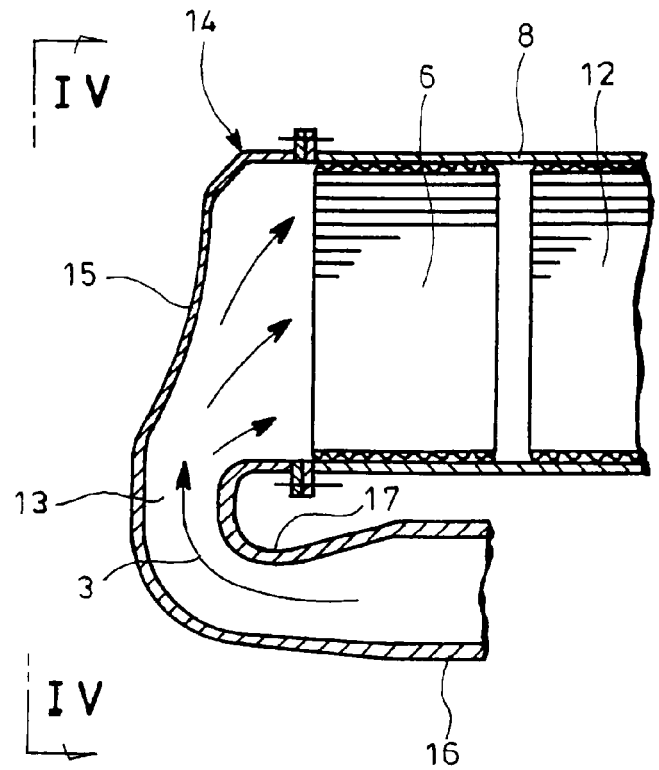
FIG. 3 is a sectional view showing an embodiment of the invention.
Figure 4:
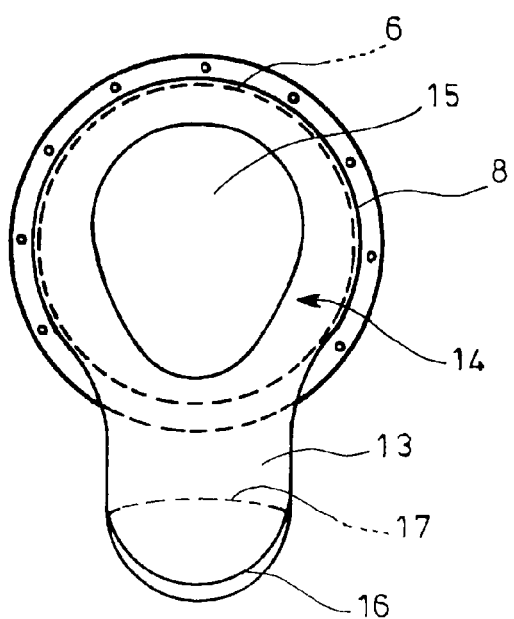
FIG. 4 is a view looking in the direction of arrows IV in FIG. 3.

FIGS. 3 and 4 show the embodiment directed to an exhaust emission control device substantially similar to that shown in FIGS. 1 and 2. Replaced for the gas dispersing chamber 9C as a downstream portion of the communication passage 9 is an introductory part 14 which encircles an inlet end of a selective reduction catalyst 6 to guide exhaust gas 3 from a direction substantially perpendicular to an axis of the selective reduction catalyst 6 through an exhaust inlet port 13. The introductory part 14 has a depression 15 (first depression) which is cumbered away from the inlet end of the selective reduction catalyst 6 and which approaches toward the inlet end of the selective reduction catalyst 6 as it extends away from the exhaust inlet port 13 toward the introduction direction of the exhaust gas.

A mixing pipe 16 (exhaust passage) extending to an inlet side of the selective reduction catalyst 6 is integrally formed with the exhaust inlet port 13 at the introductory part 14. Formed just in front of a curved portion provided by the mixing pipe 16 and the exhaust inlet port 13 is a depression 17 (second depression) which guides the exhaust gas flowing inwardly of the turning direction to outward.

The portion of the mixing pipe 16 formed with the depression 17 is vertically expanded in cross section as shown in FIG. 4 so that the cross-sectional area of the passage do not greatly change before and after the depression 17.

When it is thus constructed, the exhaust gas 3 introduced into the introductory part 14 through the exhaust inlet port 13 from the direction substantially perpendicular to the axis of the selective reduction catalyst 6 flows axially of the selective reduction catalyst 6 through turnabout, with the flow of the exhaust gas 3 directed outwardly of the turning direction being suppressed by the depression 15 and that of the exhaust gas directed inwardly of the turnabout being induced. As a result, the tendency of the flow of relatively much exhaust gas 3 biased outwardly of the turning direction is rectified to uniformiaze the distribution of the exhaust gas 3 flow into the selective reduction catalyst 6.

Moreover, especially in this embodiment, the depression 17 is formed just in front of the curved portion constituted by the mixing pipe 16 and the exhaust inlet port 13 so as to guide the flow of the exhaust gas 3 inwardly of the turning direction toward outward, so that even if center-to-center distance between the mixing pipe 16 and the selective reduction catalyst 6 is fixed and unchangeable from layout restrictions, the depression 17 causes the portion of the exhaust passage inwardly of the turning direction once directed outward at a position just in front of the curved portion so that a curvature of the curved portion can be reduced for alleviation of pace of curving, resulting in guidance of the exhaust gas flow into the exhaust inlet port 13 in a smooth manner as much as possible.

Thus, according to the above-mentioned embodiment, because of the depression 15 formed on the introductory part 14, the exhaust gas 3 can be introduced into the selective reduction catalyst 6 through the turnabout with distribution of the flow of the exhaust gas 3 being uniformized, so that the whole volume of the selective reduction catalyst 6 can be efficiently utilized for exertion of sufficient $NO_x$ reduction effect, resulting in sufficient bringing-out of the exhaust depuration ability of the selective reduction catalyst 6 to be inherently exerted.

Moreover, formation of the depression 17 just in front of the curved portion constituted by the mixing pipe 16 and the exhaust inlet port 13 makes it possible to reduce the curvature of the curved portion for alleviation of pace of curving and to guide the flow of the exhaust gas 3 into the exhaust inlet port 13 with a smooth manner as much as possible. As a result, the tendency of relatively much exhaust gas 3 biased outwardly of the turning direction can be further rectified and substantial increase in pressure loss due to turnabout of the exhaust gas 3 can be prevented.

As in the present embodiment, especially in the case where the selective reduction catalyst 6 using the urea water as the reduced catalyst constitutes the post-treatment unit, meritoriously overcome are the possibility that the misty urea water may collide against an inner wall of the curved portion owing to increased pressure loss because of the turnabout of the exhaust gas to induce the deposition of urea and the possibility that arrangement of a dispersion plate on the inlet side of the selective reduction catalyst 6 may cause the misty urea water to collides against the dispersion plate to induce the deposition of urea.

It is to be understood that an exhaust emission control device according to the invention is not limited to the above-mentioned embodiment and that various changes and modifications may be made without departing from the scope of the invention. For example, in the illustration, the invention is applied to the inlet side of the selective reduction catalyst in a case where the particulate filter is arranged in parallel with the selective reduction catalyst; however, the invention may be also similarly applicable to any post-treatment unit other than the selective reduction catalyst. The invention may be also applicable to exhaust emission control devices of various type with layouts using turnabout of the exhaust gas into the post-treatment unit.

The invention claimed is:

1. An exhaust emission control device, comprising:
   a post-treatment unit for depuration of exhaust gas passing therethrough arranged in an exhaust system, a layout being applied which introduces the exhaust gas into the post-treatment unit through turnabout; and
   an introductory part which encircles an inlet end of the post-treatment unit and which receives the exhaust gas through an exhaust inlet port, an axis of the exhaust inlet port being oriented in a direction perpendicular to an axis of said post-treatment unit, wherein
   said introductory part is formed with a first depression having a concavity that faces away from the inlet end of the post-treatment unit, the first depression approaching the inlet end of the post-treatment unit as the first depression extends away from the exhaust inlet port into an introduction direction of the exhaust gas,
   an exhaust passage connected to the exhaust inlet port of the introductory part extends upstream toward an outlet side of the post-treatment unit, such that an axis of a portion of the exhaust passage upstream of the second depression is parallel to the axis of the post-treatment unit, and
   a second depression is formed just upstream of a curved portion constituted by the exhaust passage and the exhaust inlet port so as to guide the flow of the exhaust gas away from a turning direction of the curved portion.

2. The exhaust emission control device as claimed in claim 1, wherein
   a first reference plane extends through the axis of the post-treatment unit and the axis of the portion of the exhaust passage upstream of the second depression, and
   the exhaust inlet port is elongated in a direction normal to the first reference plane relative to a direction parallel to the first reference plane.

3. The exhaust emission control device as claimed in claim 1, wherein the exhaust flow is turned 180 degrees between the second depression and the post-treatment unit.

4. The exhaust emission control device as claimed in claim 1, wherein the first depression is disposed downstream of the exhaust inlet port.

5. The exhaust emission control device as claimed in claim 1, wherein the introductory part attaches to a casing of the post-treatment unit through a flanged connection just upstream of a post treatment unit inlet plane.

* * * * *